United States Patent
Cadeau et al.

(10) Patent No.: US 10,436,444 B2
(45) Date of Patent: Oct. 8, 2019

(54) GAS VALVE UNIT

(71) Applicant: BSH Hausgeräte GmbH, Munich (DE)

(72) Inventors: Christophe Cadeau, Strasbourg (FR); Jörn Naumann, Durbach (DE)

(73) Assignee: BSH Hausgeräte GmbH, Munich (DE)

( * ) Notice: Subject to any disclaimer, the term of this patent is extended or adjusted under 35 U.S.C. 154(b) by 852 days.

(21) Appl. No.: 14/771,214

(22) PCT Filed: Mar. 5, 2014

(86) PCT No.: PCT/EP2014/054250
§ 371 (c)(1),
(2) Date: Aug. 28, 2015

(87) PCT Pub. No.: WO2014/139844
PCT Pub. Date: Sep. 18, 2014

(65) Prior Publication Data
US 2016/0010857 A1    Jan. 14, 2016

(30) Foreign Application Priority Data
Mar. 13, 2013    (EP) .................................... 13290053

(51) Int. Cl.
*F23N 1/00*    (2006.01)
*F16K 31/524*    (2006.01)
*F23N 5/10*    (2006.01)

(52) U.S. Cl.
CPC ........ *F23N 1/007* (2013.01); *F16K 31/52416* (2013.01); *F23N 5/107* (2013.01); *F23N 2035/16* (2013.01); *F23N 2035/24* (2013.01)

(58) Field of Classification Search
CPC .... F16K 31/52416; F23N 1/007; F23N 5/107; F23N 2035/16; F23N 2035/24
See application file for complete search history.

(56) References Cited

U.S. PATENT DOCUMENTS 5,938,425 A    8/1999    Damrath et al.
8,757,203 B2    6/2014    Cadeau et al.
(Continued)

FOREIGN PATENT DOCUMENTS

CN    2416292 Y    1/2001
EP    1821017 A2    8/2007
(Continued)

OTHER PUBLICATIONS

Report of Examination CN 201480014085.7 dated Jul. 11, 2016.
International Search Report PCT/EP2014/054250 dated May 27, 2014.

*Primary Examiner* — Alfred Basichas
(74) *Attorney, Agent, or Firm* — Michael E. Tschupp; Andre Pallapies; Brandon G. Braun

(57) ABSTRACT

A gas valve unit for controlling a gas throughput guided to a gas burner of a gas device includes a plurality of on-off valves. Each on-off valve includes a movable valve body with a shut-off body and an activation area, a closing spring which, when the on-off valve is closed, pushes the shut-off body onto a sealing seat and thereby closes an opening. A driver lifts the shut-off body away from the sealing seat for opening the on-off valve by a force caused by the driver when engaging into the activation area against a force of the closing spring. The valve body has a shoulder area to accept a torque arising on engagement of the driver into the activation area.

31 Claims, 9 Drawing Sheets

(56) References Cited

U.S. PATENT DOCUMENTS

2006/0016444 A1  1/2006  Clauss et al.
2013/0181152 A1  7/2013  Naumann

FOREIGN PATENT DOCUMENTS

WO            9911956        3/1999
WO     WO2011144492     * 11/2011

* cited by examiner

GAS VALVE UNIT

BACKGROUND OF THE INVENTION

The invention relates to a gas valve unit for controlling gas throughput guided to a gas burner of a gas device, in particular a gas cooking appliance, wherein the gas valve unit has at least two on-off valves.

Gas valve units of the said type are described for example in the publications EP0818655A2 and W02004063629 A1. With these types of gas valve unit the gas throughput guided to a gas burner of a gas cooking appliance can be controlled in a number of stages. In such cases the gas throughput possesses a reproducible size at each stage. The throughflow cross-section of the gas of unit overall and consequently the size of the gas throughput are set by specific on-off valves of the gas valve unit being opened or closed and through this by the gas flow being enabled or interrupted through specific throttle openings.

In the known generic gas valve units the on-off valves are actuated individually electromagnetically. To this end a separate electromagnet, which opens or closes the on-off valve, is assigned to each of the on-off valves. The electromagnets are activated by an electronic control unit. This electronic control unit processes the signals created by a person operating the gas cooking appliance by means of an electric control element and activates the electromagnets of the on-off valves accordingly.

WO 2012/049049 A2 further shows a gas valve unit for controlling gas throughput guided to a gas burner of a gas device, in particular a gas cooking appliance, wherein the gas valve unit has at least two on-off valves, wherein the at least two on-off valves are able to be actuated mechanically by moving at least one body relative to the on-off valves.

BRIEF SUMMARY OF THE INVENTION

Against this background, one object of the following invention is to make available an improved gas valve unit of the type mentioned at the start.

This object is achieved in accordance with the invention by the valve body having a shoulder area which is configured to take up torque resulting from the engagement of the driver into the actuation area.

In accordance with a first aspect of the invention a gas valve for controlling gas throughput guided to a gas burner of a gas device, in particular a gas cooking appliance, is thus proposed, wherein the gas valve unit has a plurality N of on-off valves, wherein each on-off valve has a movable valve body with a shut-off body and an activation area, a closing spring which, when the on-off valve is closed, presses the shut-off body onto a valve seat and thus closes an aperture, and a driver. In this case the driver is designed to lift the shut-off body from the valve seat for opening the on-off valve by means of a force that is exerted by the driver that engages in the actuation area against the force of the closing spring. The valve body has a shoulder area which is configured to take up the torque resulting from the engagement of the driver into the actuation area.

The present gas valve unit is improved such that the torque arising when the driver engages into the actuation area is reduced. In this case the vertical tipping torque is especially reduced by the shoulder area (shoulder) on the valve body when the driver acts on the lever arm of the valve body. With this contact a rotational torque also acts on the lever arm of the valve body in addition to the vertical tipping torque. Without the shoulder the uplift torques could not be captured.

The gas valve unit is actuated by the location or the spatial alignment of the driver being changed in relation to the on-off valves to be actuated. To actuate the respective on-off valves the position of the driver relative to the shut-off body of the respective on-off valve is able to be changed. The actuation area is preferably actuated by the driver when the actuation area is located above the driver. Otherwise the on-off valve is closed by means of the force acting on the shut-off body.

If the driver is moved manually by an operator, no electrical components are required for switching the on-off valves. As an alternative the driver can also be moved by means of any given actuation device, for example an electric motor. The electric motor in this case is activated by an electrical control unit. This makes it possible for the same gas valve unit to be optionally actuated mechanically by an operator or to be actuated by means of an electrical actuation element. An electric motor, especially a stepping motor, is especially used for the electrical actuation element. The actuation element is activated by an electrical control unit in this case, for example as a function of the signals of an electrical user interface or as a function of automated functions, for example an automated power regulation or an automatic shut off device. In the manufacturing of cooking appliances identically-constructed gas valves can be combined both with mechanical user interfaces, for example rotary knobs, and also with electrical user interfaces, for example touch sensors.

The gas valve unit is especially part of a manually-operated multiple control device which consists of valve part and an adapted ignition safety device. In particular a grip for rotary knob, valves, nozzles and seals integrated into the valve part. The grip can be pressed in by light pressure. The ignition safety device is actuated by said pressure. The on-off valves are pressed in one or more gas-tight chambers through one or more spring components onto seals and thus prevent gas flowing through the associated openings or sealing openings. The sprung components or springs are held at their other end on a circular disk which is closed off by a cover attached in a gas-tight manner.

In accordance with one form of embodiment the shoulder area is also embodied to restrict a lift of the valve body in the gas valve unit.

The lift restriction of the valve body in the gas valve unit ensures that the valve body, when the cover plate is taken off, cannot be pushed out of the valve housing.

In accordance with a further form of embodiment the activation area is embodied as a lever arm connected to the shoulder area. An installation space for the pre-tensioned closing spring is formed between the lever arm and the shut-off body of the valve body.

In accordance with a further form of embodiment the closing spring is positioned between the shut-off body and the lever arm. The closing spring is positioned with a predetermined pre-tensioning in the installation space mentioned above.

In accordance with a further form of embodiment the pressure plate is provided for positioning the closing springs between the shut-off bodies and the lever arms. In this case the pressure plate is configured to provide a predetermined spacing between the respective lever arm and the respective closing spring and to pre-tension the respective closing spring.

The pressure plate is especially embodied as a circular disk with torsion proofing and tabs for centering the springs.

According to a further form of embodiment the distance for engagement of the driver into the activation area of the valve body is predetermined. The distance is selected so that the driver can engage into the actuation area and the closing spring experiences its predetermined pre-tensioning.

According to a further form of embodiment the pressure plate has at least N tabs for centering the N closing springs. In this form of embodiment one tab is provided for each closing spring.

According to a further form of embodiment the pressure plate has 2N tabs for centering the N closing springs, wherein each of the 2N tabs is configured for centering one of the N closing springs. In this form of embodiment two tabs are provided for centering each of the closing springs.

An especially expedient arrangement is produced if the shut-off bodies of the individual on-off valves are disposed on a circular track around an axis of the gas valve and the shut-off bodies are able to be moved in parallel to this axis. This produces a ring-shaped arrangement in which the openings of the valve sealing plates are also arranged on a circular track. The shut-off bodies are moved in parallel to the plane of the valve sealing plate.

According to a further form of embodiment the pressure plate is embodied as a circular disk with at least N tabs for centering the N closing springs. Preferably torsion proofing is provided for torsion-proof positioning of the circular disk in the gas valve unit.

According to a further form of embodiment the driver and the on-off valves are designed so that, depending on the position of the driver, either no on-off valve or precisely one on-off valve or precisely two on-off valves are opened. The size of the respective body and the possible positions of the driver are designed for example so that the driver can open at most one on-off valve at one time. In the zero position of the grip shaft the driver is not disposed over an on-off valve.

Preferably the driver is disposed, as a function of an angle of the grip shaft, over the on-off valves arranged in a row.

In particular the driver is disposed, for a first angle of the grip shaft of the gas valve, above the first on-off valve of the row of on-off valves.

As explained above, a plurality N of on-off valves is provided, wherein each on-off valve has a movable shut-off body, which, when the on-off valve is closed, is against a valve seat and thereby closes off an opening or valve opening in the valve seat. When the on-off valve is open gas flows through the opening in the valve seat. This gas flow is interrupted if the shut-off body of the respective on-off valve is resting against the valve seat. In particular the openings have different diameters. Preferably the first to nth openings have a reducing diameter. Thus the switched additional load can be increased depending on the angle of rotation.

Preferably the valve seat is designed as an essentially flat surface. The flat surface of the valve seat forms the sealing surface in relation to the respective shut-off body. For manufacturing the valve seat per se no mechanical processing steps are thus necessary, if a plate material is used for manufacturing the valve seat. Only the openings must then be made in the flat surface. As an alternative the valve seat can be embodied as a molded seal, wherein the shut-off body is then embodied flat on its sealing surface. The advantage of this variant is that the danger of damage to the sealing edge on the shut-off body is reduced.

Especially advantageously the valve seats of the plurality of on-off valves are formed from a common component. This common component can be embodied as a valve sealing plate and for each on-off valve possesses an opening or valve opening and a valve seat assigned to the opening. In particular each on-off valve has a closing spring which, when the on-off valve is closed, presses the shut-off body onto the valve seat. The closing spring thus creates the closing force of the on-off valve. The closing spring thus insures that, independently of the installation position of the gas valve unit, e.g. even when the inertia of the shut-off body is working against the force of the closing spring, the on-off valve closes securely.

Preferably each shut-off body is formed by an essentially cylindrical plunger. At its end facing towards the valve seat, the shut-off body has a ring-shaped sealing edge. Each shut-off body is guided axially-movably in a valve body of the gas valve unit.

According to a further form of embodiment the driver is embodied as a part of a control disk, which has a torque transmission device for transmitting the torque from the grip shaft of the gas valve unit to the control disk.

According to a further form of embodiment the openings have different diameters, wherein the first to Nth opening have an opening cross-section which decreases in series.

In accordance with a second aspect of the invention a gas valve is proposed which has at least one gas valve unit in accordance with the first aspect or in accordance with a form of embodiment of the first aspect.

In accordance with a third aspect of the invention a gas appliance, especially a gas oven, is proposed which has a gas valve in accordance with the second aspect.

Further possible implementations of the invention also include combinations not explicitly cited of features or forms of embodiment described previously or below in relation to the exemplary embodiments. In this case the person skilled in the art will also add individual aspects as improvements or additions to the respective basic form of the invention.

BRIEF DESCRIPTION OF THE DRAWINGS

Further advantageous embodiments and aspects of the invention are the subject matter of the dependent claims as well as the exemplary embodiments of the invention described below. The invention is also explained in greater detail on the basis of preferred forms of embodiment, which refer to the enclosed figures, in which:

FIG. 3 shows a sectional view of a gas valve according to FIG. 1 with grip shaft pressed in.

DETAILED DESCRIPTION OF EXEMPLARY EMBODIMENTS OF THE PRESENT INVENTION

Figure 1:
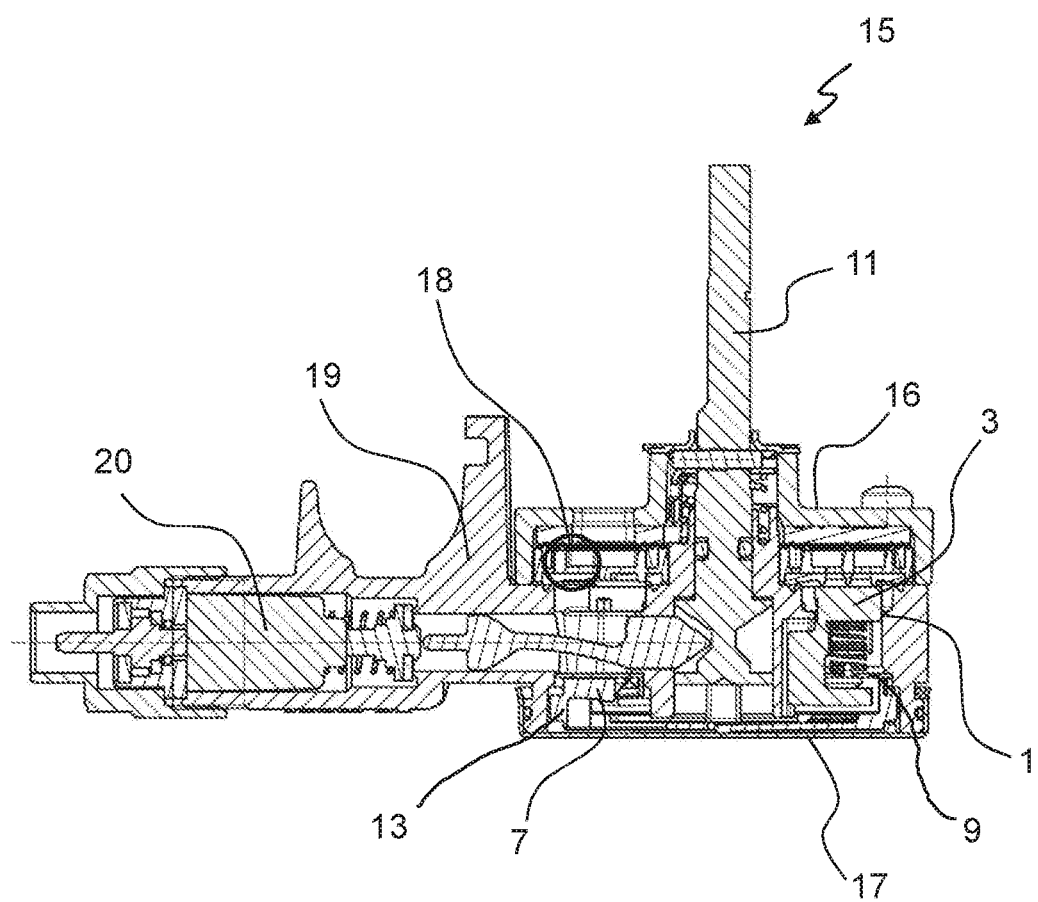
FIG. 1 shows a sectional view of a gas valve with a gas valve unit.

FIGS. 1 to 12 show a gas valve 15, which is suitable for controlling gas throughput guided to a gas burner of a gas cooking appliance.

The gas valve 15 has a gas input, by which it is connected for example to a main gas line of a gas cooking appliance. The gas provided for burning is at a constant pressure, of for example 20 mbar to 50 mbar at the gas input. Connected to a gas output of the gas valve 15 is a gas line leading for example to a gas burner of the gas cooking appliance. The gas input is connected via a gas output space of the gas valve 15 to the input side of nine on-off valves 2.1-2.9 in the present exemplary embodiment (see FIG. 8). By opening the on-off valves 2.1-2.9 the gas input is connected in each case with the gas output area.

Each on-off valve 2.1-2.9 has a movable valve body 3 with a shut-off body 4 and an activation area 5, a closing spring 6.1-6.9, which, when the on-off valve 2.1-2.9 is closed, presses the shut-off body 4 onto a valve seat and through this closes off an opening, and a driver 7, which is embodied to lift the shut-off body 4 for opening the on-off valve 2.1-2.9 away from the valve seat by means of a force caused by the driver 7 engaging into the activation area 5 (see FIG. 12) against the force of the closing spring 6.1-6.9. In this case the driver 7 and the on-off valves 2.1 to 2.9 are embodied such that, as a function of the position of the driver 7, either no on-off valves 2.1 to 2.9 or precisely one on-off valve 2.1 to 2.9 or precisely two on-off valves 2.1 to 2.9 are opened. The shut-off body 4 is formed for example by an essentially cylindrical plunger. The valve seats of the on-off valves 2.1 to 2.9 are preferably formed by a common component. Shoulder 8 moves within movement area 32.

Figure 5:
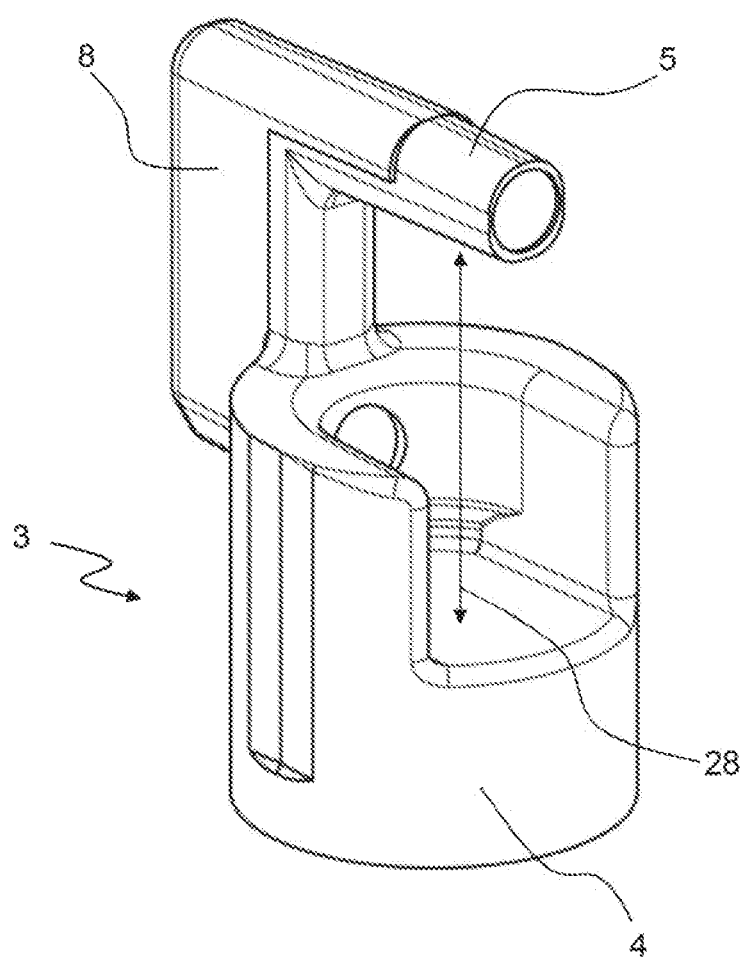
FIG. 5 shows a view of the valve body of the gas valve according to FIG. 1.

In this case the valve body 3 has a shoulder area 8, that moves within a movement area 32 and is embodied to accept a torque arising when the driver 7 engages into the activation area 5 (see FIG. 5).

For this purpose an opening is assigned in a nozzle plate 24 in the respective on-off valve 2.1 to 2.9. When the on-off valve 2.1 to 2.9 is opened gas can reach the gas output area from the gas input area. In detail FIG. 1 shows a sectional view of the gas valve 15 with the gas valve unit 1.

The gas valve 15 is essentially composed of the gas valve unit 1, the valve housing 19, the magnet insert 20, the cover plate 16 with the compound sealing plate 18, the grip shaft 11, the valve bodies 3, the ring-shaped disk 9, the control disk 13 and the valve housing cover 17.

Figure 2:
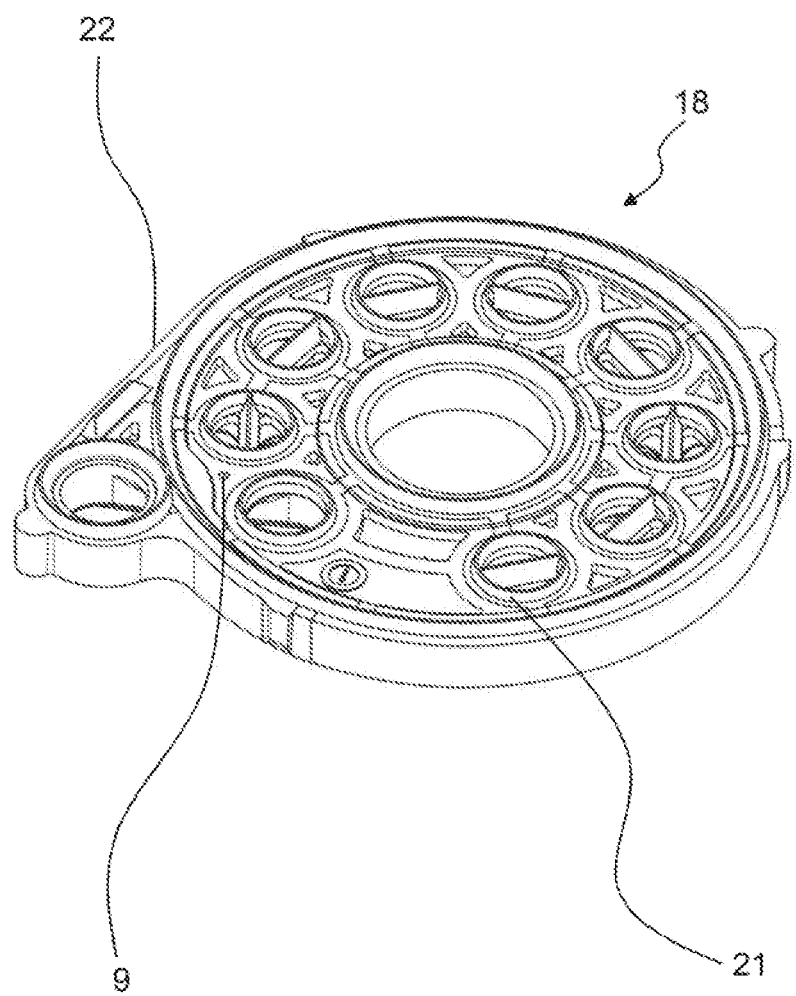
FIG. 2 shows a view of a compound sealing plate.

The compound sealing plate 18 consists according to FIG. 2 of nine sealing seats 21, the ring-shaped disk 9 (here embodied as a pressure plate and the lower gas distribution plate 22. The sealing seats 21 are embodied for example as individual silicon ring sealing surfaces. The pressure plate 9 is formed for example as a plastic carrier. The lower gas distribution plate 22 is embodied for example—like the sealing seat 21—as individual silicon ring sealing surfaces.

Figure 3:
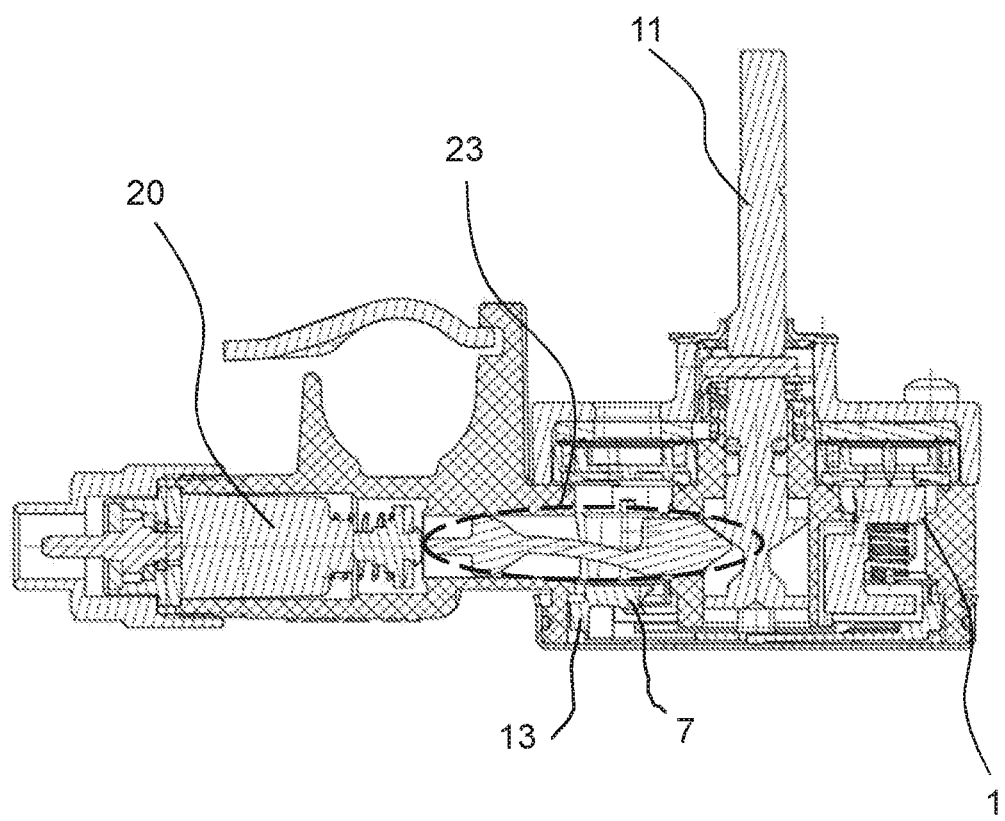

The grip shaft 11 is rotatable and can be pushed in by light pressure. To this end FIG. 3 shows a sectional view of the gas valve 15 of FIG. 1 with the grip shaft 11 pushed in. When the grip shaft 11 is pushed in a magnet insert 20 is actuated via a deflection system 23. The compound sealing plate 18 lies on the side facing towards the grip shaft 11 and is integrated into a cover 16, wherein the compound sealing plate 18 points towards the opposite side of the grip shaft 11.

Figure 4:
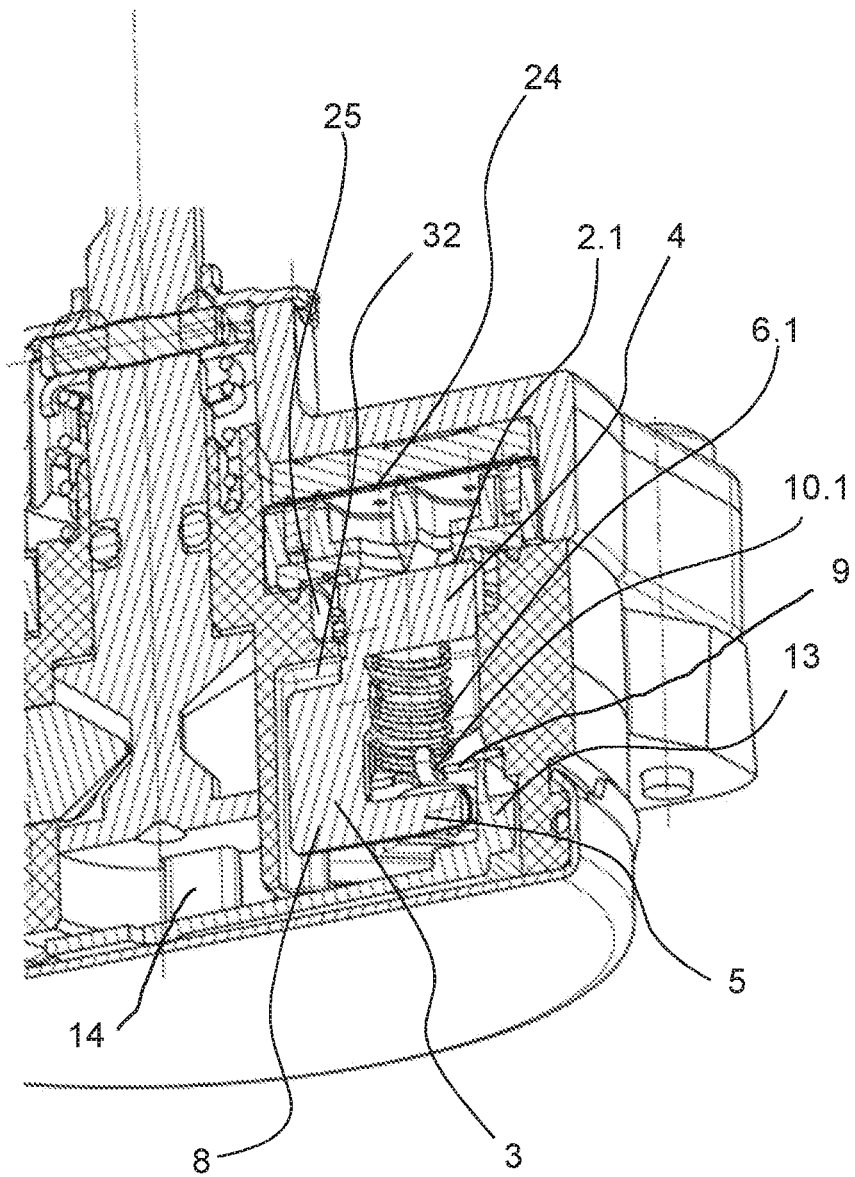
FIG. 4 shows a detailed view of FIG. 3.

The valve bodies 3 are pressed in the gaseous ring-shaped area by the closing springs 6.1 to 6.9 onto the silicon ring-shaped sealing surfaces of the compound sealing plate 18 and thus prevent the throughflow to the associated nozzle openings in the nozzle plate 24 lying above them (see FIG. 4). The valve bodies 3 penetrate through the ring disk 9 with a shoulder area 8. FIG. 4 shows a detailed view of FIG. 3 here.

FIG. 4 also shows the nozzle plate 24, the gas-guiding space 25, the ring-shaped disk 9 and a tab 10.1 for the closing spring 6.1 in detail. The valve body 3 is suitable, with its shoulder area 8 and its activation area 5 (here embodied as a lever arm 51, for limiting lift and for compensating for torque, especially tipping torque.

To this end FIG. 5 shows a view of a valve body 3 of the gas valve unit 1 according to FIGS. 1 and 3. The valve body 3 has the shut-off body 4, the shoulder area 8 connected to the shut-off body 4 and the lever arm 5 connected to the shoulder area 8. The reference character 28 of FIG. 5 shows the installation space for the pre-tensioned closing spring 6.1. Through the present embodiment of the valve body 3 with the shoulder area 8 the valve body 3 is advantageously prevented from being pushed out of the valve housing 19 when the cover plate 16 is taken off.

Furthermore the shoulder area 8 on the valve body 3 also prevents the vertical tipping torque when the driver 7 is acting on the lever arm 5 of the valve body 3. In this contact, in addition to the vertical tipping torque, a rotational torque also acts on the lever at the foot of the valve body 3. The shoulder area 8 (shoulder) accordingly captures the torques arising.

Figure 6:
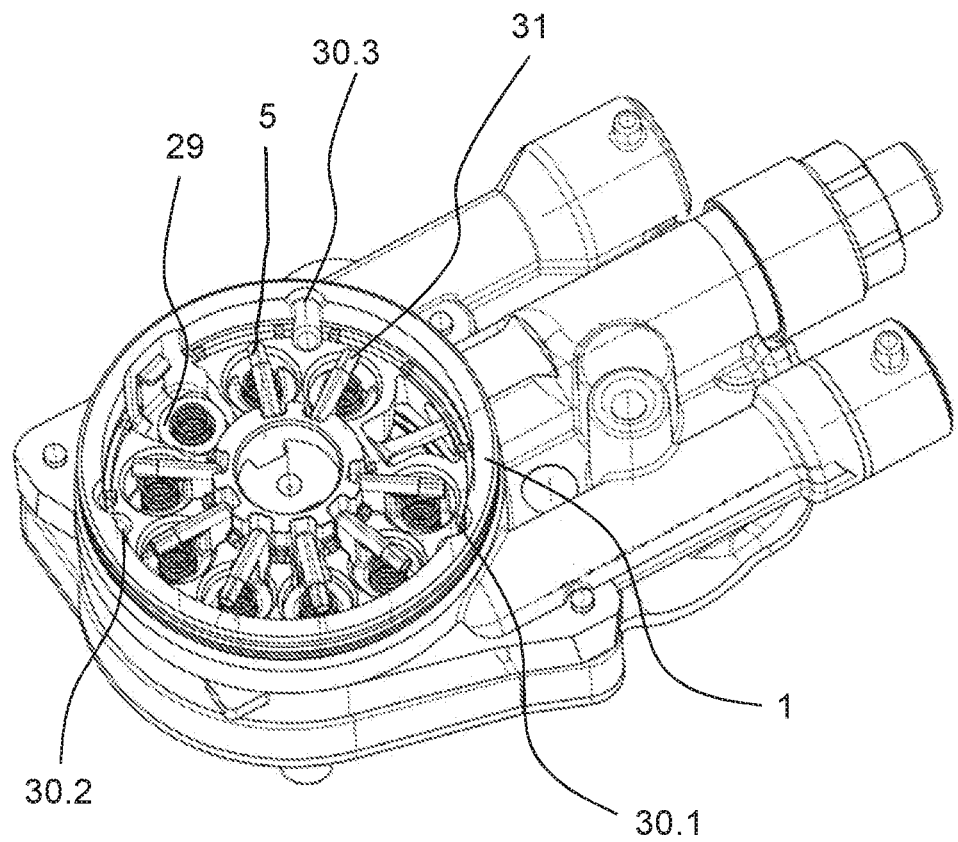
FIG. 6 shows a view from below of the gas valve unit according to FIG. 1.

Depending on the embodiment variant a specific number of valve bodies 3 with springs 6.1-6.9 are inserted into the valve housing 19. To this end FIG. 6 shows a view from below of the gas valve 15 according to FIG. 1. Without restricting general applicability the gas valve 15 of FIG. 6 has nine valve bodies 31 with pre-tensioned springs. For reasons of clarity only one valve body is provided with the reference character 31 in FIG. 6. The reference character 29 in FIG. 6 shows a particular embodiment for a multi-circuit valve unit. The reference characters 30.1 to 30.3 illustrate spaces for torsion-proofing devices of the ring-shaped disk 9.

Figure 7:
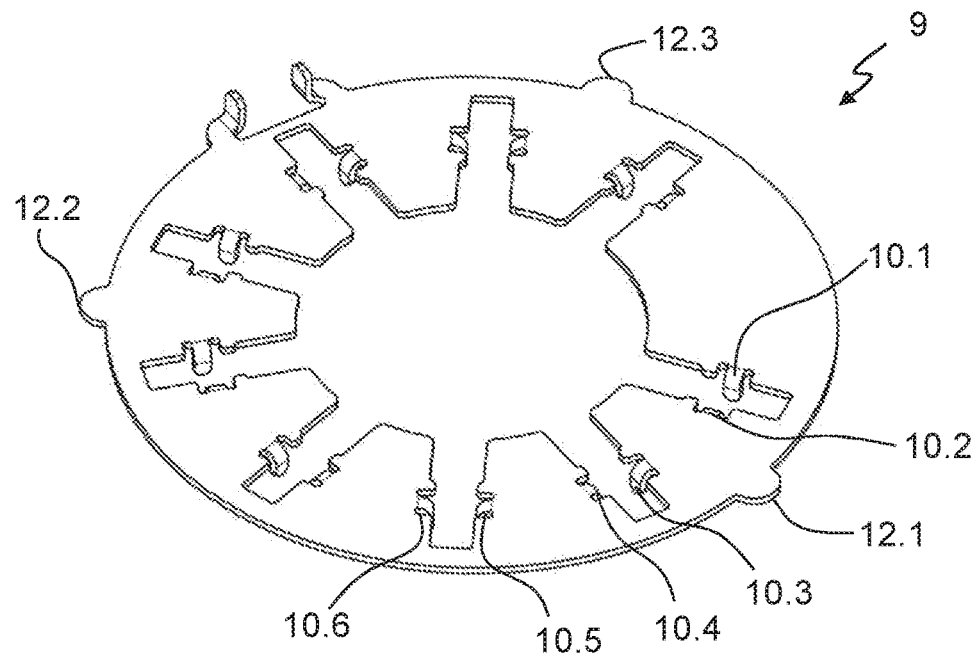
FIG. 7 shows a view of the ring-shaped disk of the gas valve unit according to FIG. 1.

To this end FIG. 7 shows a view of the ring-shaped disk 9 of the gas valve 15 according to FIG. 1. The ring-shaped disk 9 is provided for positioning of the closing springs 6.1-6.9 between the shut-off bodies 4 and the lever arms 5. The ring-shaped disk 9 in this case is configured to provide a predetermined distance between the respective lever arm 5 and the respective closing springs 6.1-6 and to pre-tension the respective closing springs 6.1-6.9. To this end FIG. 8 shows a view from below of the gas valve 15 according to FIG. 6 with the ring-shaped disk 9 according to FIG. 7 inserted.

Furthermore the ring-shaped disk 9 has 18 tabs 10.1-10.18 for centering the nine closing springs 6.1-6.9. For reasons of clarity only six tabs 10.1-10.6 are provided with reference characters in FIG. 7. Furthermore the ring-shaped disk 9 has a torsion-proofing device 12.1-12.3 for torsion-proof positioning of the ring-shaped disk 9 in the valve housing 19. This is shown in more detail in FIG. 8. In this figure the torsion proofing devices 12.1-12.3 of the ring-shaped disk 9 are inserted into the spaces 30.1 to 30.3 provided for them.

Figure 8:
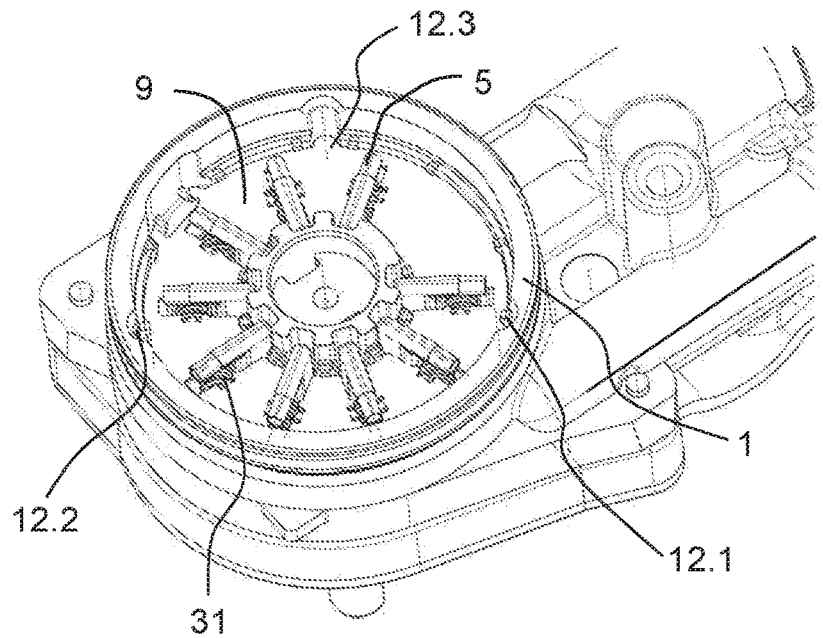
FIG. 8 shows a view from below of the gas valve unit according to FIG. 6 with inserted ring-shaped disk according to FIG. 7.

In accordance with FIG. 8 the ring-shaped disk 9 is lying on the pre-tensioned springs 6.1-6.9, wherein the tabs 10.1-

10.18 placed on the ring-shaped disk 9 engage into the springs 6.1-6.9 and fix said springs.

So that a corresponding pressure can be established in the valve body 3 the ring-shaped disk 9 is pressed downwards in accordance with the predetermined distance. In this case the pre-tensioned closing springs 6.1-6.9 release from the lever arms 5 of the valve body 3. In this position the ring-shaped disk 9 and the valve housing 19 are clamped to one another in accordance with FIG. 8. Next a control disk 13 is installed, which has the driver 7 (see FIGS. 9 and 10).

Figure 9:
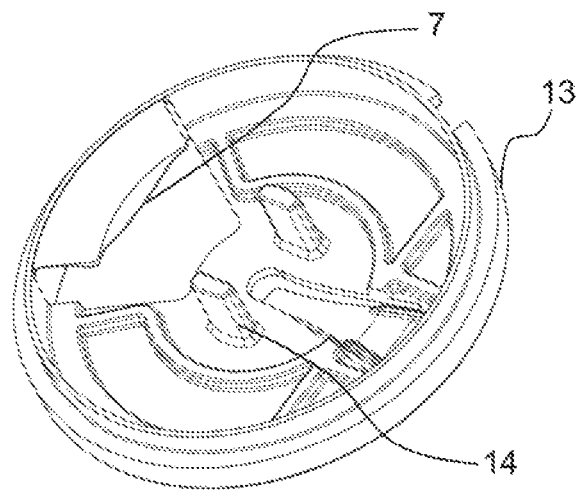
FIG. 9 shows a view from above of a first exemplary embodiment of the control disk.
Figure 10:
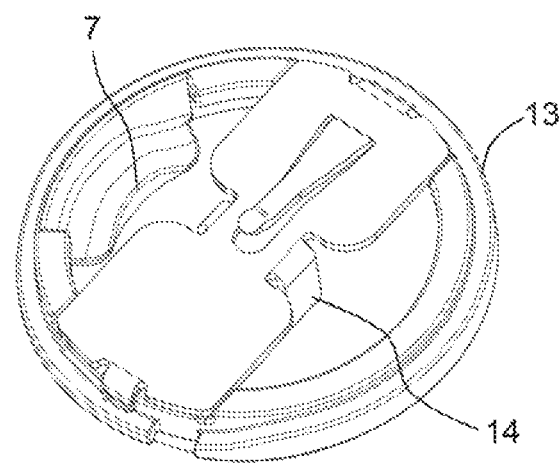
FIG. 10 shows a view from below of a second exemplary embodiment of the control disk.

The driver 7 is disposed as a function of an angle of the grip shaft 11 of the gas valve 15 over the on-off valves 2.1-2.9 disposed in a circular shape. The webs 14 act to transmit the rotational torque from the grip shaft 11 of the gas valve 15 to the control disk 13. In this case the webs 14 penetrate into the receptacles of the grip shafts 11 and transform the rotational torque to the control disk 13, so that the lifting movements can be implemented. A one-piece control disk 13 is shown in FIG. 9. It is further possible to embody the control disk 13 in several pieces. An example of this can be found in FIG. 10.

Figure 11:
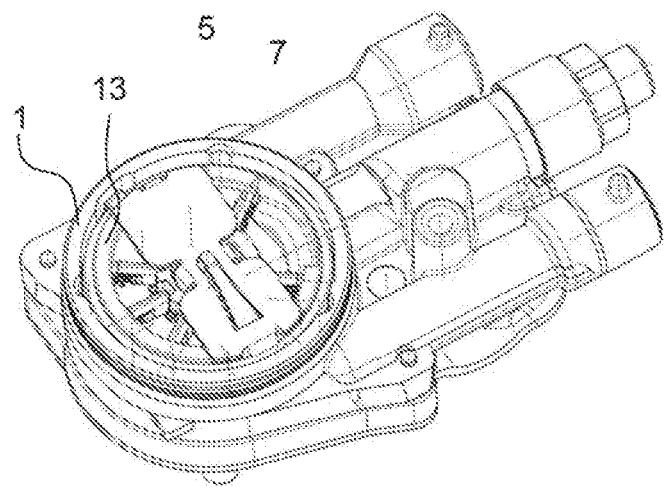
FIG. 11 shows a view from below of the gas valve unit according to FIG. 8 with inserted control disk according to FIGS. 9 & 10 in the closed position.
Figure 12:
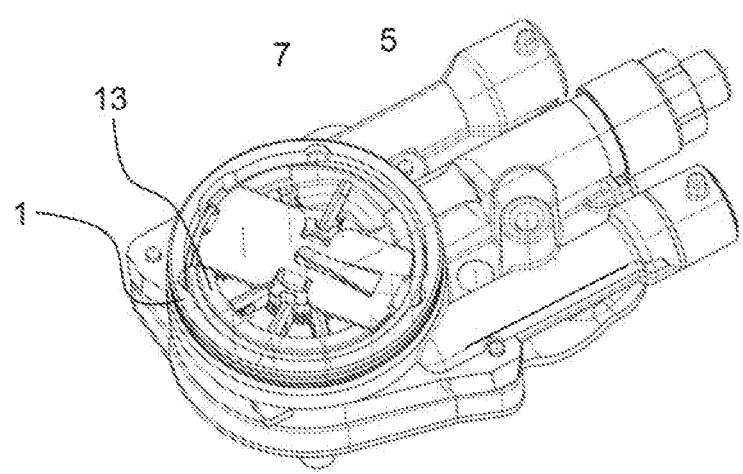
FIG. 12 shows a view from below of the gas valve unit according to FIG. 8 with inserted control disk according to FIGS. 9 & 10 in the open position.

The control disk, in accordance with FIG. 9 for example, is laid in the valve housing 19 with the webs 14 to the front, so that the driver 7 lies between the first and last valve body 3 (see FIG. 11). With rotational actuation of the grip shafts 11 the control disk 13 slides on the ring-shaped disk so that the control disk 13 with the driver 7 makes contact with one or two valve body lever arms 5 and opens or closes said body (see FIG. 12).

The mechanically-switching gas valve 15 can be operated manually. Electronics is not necessary, a motor drive can be employed however.

Through the present arrangement a rotational path of around 320° is provided. The present gas valve is able to be used for any type of gas, even for liquid gas.

There are further variants of the gas valve in which, in the individual switching stages, varying amounts of gas can be achieved in relation to a basic load. As a function of the embodiment of the opening cross sections a constantly rising amount of gas in relation to the basic load is also able to be presented. Furthermore even a zigzag profile for the amount of gas provided is possible.

No grease is necessary in the switching processes of the on-off valves so that no shifting of the switching points can occur.

Furthermore, with a few embodiments of the gas valve the structure of the on-off valves, seen from the compound sealing plate in the direction of flow, can also be embodied very simply, since making double holes in the nozzle plate and further gas distribution plates can be dispensed with.

The invention claimed is:

1. A gas valve unit for controlling a gas throughput guided to a gas burner of a gas device, comprising a plurality of on-off valves, each on-off valve including a movable valve body with a shut-off body and an activation area, a closing spring which, when the on-off valve is closed, pushes the shut-off body onto a sealing seat and thereby closes an opening, and a driver configured to lift the shut-off body away from the sealing seat for opening the on-off valve by a force caused by the driver when engaging into the activation area against a force of the closing spring, said valve body having a shoulder area configured to accept a torque arising on engagement of the driver into the activation area, wherein the activation area is embodied as a lever arm connected with the shoulder area.

2. The gas valve unit of claim 1 for controlling the gas throughput guided to the gas burner of a gas cooking appliance as the gas device.

3. The gas valve unit of claim 1, wherein the shoulder area is configured to restrict a lift of the valve body in the gas valve unit.

4. The gas valve unit of claim 3, wherein the closing spring is positioned between the shut-off body and the lever arm.

5. The gas valve unit of claim 1, further comprising a ring-shaped disk which is configured to position the closing spring of each of the on-off valves between the shut-off body and the lever arm and to provide a predetermined distance between the lever arm and the closing spring, said ring-shaped disk maintaining the closing springs of the on-off valves under tension.

6. The gas valve unit of claim 5, wherein the distance is predetermined for engagement of the driver into the activation area of the valve body.

7. The gas valve unit of claim 5, wherein the ring-shaped disk has a plurality of tabs of a number corresponding to a number of the closings springs of the on-off valves for centering the closing springs.

8. The gas valve unit of claim 7, wherein the number of tabs of the ring-shaped disk for centering the closing springs is twice the number of the closing springs of the on-off valves, each said closing spring being centered by two of the tabs.

9. The gas valve unit of claim 5, wherein the ring-shaped disk includes at least one torsion proofing device for torsion-proof positioning of the ring-shaped disk in the gas valve unit.

10. The gas valve unit of claim 1, wherein the shut-off bodies of the on-off valves are disposed on a circular track around an axis of the gas valve unit, said shut-off bodies being movable in parallel relation to the axis.

11. The gas valve unit of claim 10, further comprising a grip shaft to define the axis.

12. The gas valve unit of claim 1, wherein the driver and the on-off valves are configured such that, depending on a position of the driver, either none of the on-off valves is opened or precisely one of the on-off valves is opened or precisely two of the on-off valves are opened.

13. The gas valve unit of claim 1, wherein the on-off valves are arranged in a circular arrangement, and further comprising a grip shaft, said driver being disposed, as a function of an angle of the grip shaft, above the circular arrangement of the on-off valves.

14. The gas valve unit of claim 13, further comprising a control disk including a torque transmission device for transmitting a torque from the grip shaft to the control disk, said driver forming part of the control disk.

15. The gas valve unit of claim 1, further comprising a nozzle plate having openings of different diameters with successively decreasing opening cross section.

16. A gas valve, comprising at least one gas valve unit for controlling a gas throughput guided to a gas burner of a gas device, said gas valve unit comprising a plurality of on-off valves, each on-off valve including a movable valve body with a shut-off body and an activation area, a closing spring which, when the on-off valve is closed, pushes the shut-off body onto a sealing seat and thereby closes an opening, and a driver configured to lift the shut-off body away from the sealing seat for opening the on-off valve by a force caused by the driver when engaging into the activation area against a force of the closing spring, said valve body having a shoulder area configured to accept a torque arising on engagement of the driver into the activation area, wherein the activation area is embodied as a lever arm connected with the shoulder area.

17. The gas valve of claim 16, wherein the shoulder area is configured to restrict a lift of the valve body in the gas valve.

18. The gas valve of claim 16, wherein the closing spring is positioned between the shut-off body and the lever arm.

19. The gas valve of claim 18, wherein the gas valve unit includes a ring-shaped disk which is configured to position the closing spring of each of the on-off valves between the shut-off body and the lever arm and to provide a predetermined distance between the lever arm and the closing spring, said ring-shaped disk maintaining the closing springs of the on-off valves under tension.

20. The gas valve of claim 19, wherein the ring-shaped disk includes at least one torsion proofing device for torsion-proof positioning of the ring-shaped disk in the gas valve.

21. The gas valve of claim 19, wherein the distance is predetermined for engagement of the driver into the activation area of the valve body.

22. The gas valve of claim 19, wherein the ring-shaped disk has a plurality of tabs of a number corresponding to a number of the closings springs of the on-off valves for centering the closing springs.

23. The gas valve of claim 22, wherein the number of tabs of the ring-shaped disk for centering the closing springs is twice the number of the closings springs of the on-off valves, each said closing spring being centered by two of the tabs.

24. The gas valve of claim 16, wherein the shut-off bodies of the on-off valves are disposed on a circular track around an axis of the gas valve, said shut-off bodies being movable in parallel relation to the axis.

25. The gas valve of claim 24, wherein the gas valve unit includes a grip shaft to define the axis.

26. The gas valve of claim 16, wherein the driver and the on-off valves are configured such that, depending on a position of the driver, either none of the on-off valves is opened or precisely one of the on-off valves is opened or precisely two of the on-off valves are opened.

27. The gas valve of claim 16, wherein the on-off valves are arranged in a circular arrangement, wherein the gas valve unit includes a grip shaft, said driver being disposed, as a function of an angle of the grip shaft, above the circular arrangement of the on-off valves.

28. The gas valve of claim 27, wherein the gas valve unit includes a control disk including a torque transmission device for transmitting a torque from the grip shaft to the control disk, said driver forming part of the control disk.

29. The gas valve of claim 16, wherein the gas valve unit includes a nozzle plate having openings of different diameters with successively decreasing opening cross section.

30. A gas appliance, comprising a gas valve, said gas valve comprising at least one gas valve unit for controlling a gas throughput guided to a gas burner of a gas device, said gas valve unit comprising a plurality of on-off valves, each on-off valve including a movable valve body with a shut-off body and an activation area, a closing spring which, when the on-off valve is closed, pushes the shut-off body onto a sealing seat and thereby closes an opening, and a driver configured to lift the shut-off body away from the sealing seat for opening the on-off valve by a force caused by the driver when engaging into the activation area against a force of the closing spring, said valve body having a shoulder area configured to accept a torque arising on engagement of the driver into the activation area, wherein the activation area is embodied as a lever arm connected with the shoulder area.

31. The gas appliance of claim 30, constructed in the form of a gas oven.

* * * * *